Patented July 18, 1933

1,918,338

UNITED STATES PATENT OFFICE

HANS KAUFMANN, OF JENA, GERMANY

PROCESS OF MAKING SILICYL COMPOUNDS

No Drawing. Application filed November 13, 1929, Serial No. 406,974, and in Germany November 16, 1928.

This invention relates to a process of making silicyl-compounds and essentially consists in bringing about reaction between hydroxy carboxylic acids or their esters or salts with tetrachloride of silicon preferably in the presence of an acid fixing substance or by causing the hydroxy carboxylic acid esters to undergo a reaction with silicic acid alkyl esters.

Compounds of silicon with hydroxyl containing organic substances are known, such as for instance described in the German Patent 285,285 and the Austrian Patent 86,131. These compounds are insoluble in water or easily decompose in solution producing silicic acid. The hereinbelow described experiments are on the one hand based upon the principle to produce in a synthetic way organic compounds of silicic acid which compounds are stable towards water or which are soluble in not decomposed condition in weak alkalines. For this purpose derivatives of hydroxy carboxylic acids have appeared to be suitable, said derivatives being coupled to silicon by the aid of the hydroxyl group and having still free carboxyl groups available for the production of soluble salts. On the other hand for the synthetic production or organic compounds of silicic acid which are soluble in fat the principle has been used to produce compounds by the aid of suitable highly molecular hydroxy carboxylic acids, such as for instance ricinoleic acid. It may be noted that hydrated silicic acid is not resorbed (see Brest, Biochem. Ztschr., volume 108, page 308, 1920) and is subject to danger of coagulation, when employed in colloidal condition. Such compounds of silicon, however, become soluble in water in the presence of alkali, while in acids the basic substance containing silicon will be regenerated. The solubility in fat, however, had to be a prominent characteristic in case hydroxy carboxylic acids were taken in which the carboxyl group forming a center of hydration is protected, that is, for instance, if the hydroxy carboxylic acid ester had been used as original material.

Such esters may be combined with silicon by interaction with derivatives of silicic acid alkyl ester derivatives. Thus, for instance, ricinoleic acid ethyl ester will split off alcohol when heated with silicic acid tetraethyl ester and there will be obtained an ester of silicic acid of the ricinoleic acid ethyl ester. In such substances the residue of silicic acid may be designated as the silicyl residue. The silicyl-compound of the ricinoleic acid ethyl ester is produced according to the following reaction:

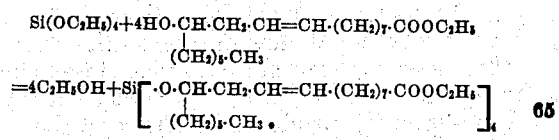

In a more convenient manner, however, the aforementioned principle may be carried out, if halogen compounds of silicon, preferably silicon tetrachloride is used. If the free hydroxy carboxylic acids shall be transformed, there will, however, be the danger of undesirable additional reactions, such as for instance, the chlorination of the acids. It has been found that organic substances containing hydroxyl may be advantageously caused to interact with silicon tetrachloride by using simultaneously acid fixing substances, such as pyridine, or in case of hydroxy carboxylic acids their inorganic salts. Practice has proven that it will be suitable to employ salts which are soluble in organic solvents, that is for instance, zinc salts soluble in pyridine or ether. As a final product in this case the compound of silicon of the free acid may be formed, while the zinc will appear as chloride, eventually as a complex pyridine-zinc chloride compound. An example of this kind for silicyl lactic acid is given in the following:

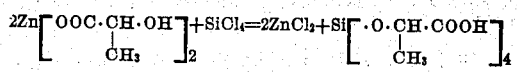

The silicyl-ricinoleic acid fulfills the requirement of greater stability. Silicyl-ricinoleic acid may be dissolved in ammonia without decomposition and the ammonia compound may now be converted into other salts. Furthermore, the use of such unsaturated hydroxy carboxylic acids is connected with the advantage that derivatives may be made more easily. The silicyl-ricinoleic acid may be brominated and iodinated and these derivatives will likewise produce salts.

Other silicyl derivatives of hydroxy carboxylic acids although being little stable towards water are not quite without value for therapeutical purposes, if they are, for instance, soluble in fat and if they can be injected in an oil solution or if the hydroxy carboxylic acid itself possesses certain therapeutic properties.

As an example of this kind there may be mentioned the o-silicyl-salicylic acid methyl ester and its analogues:

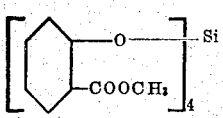

The herein described compounds are intended for therapeutical use.

Examples 1. 10 parts of ricinoleic ethyl ester are heated together with 2 parts of silicic tetraethyl ester for several hours in a closed container to a temperature of about 150° C. Thereupon the produced alcohol and the excess of silicic acid tetraethyl ester are distilled off in the vacuum, the product is taken up in ether, washed with water and thereupon dried with anhydrous sodium sulphate and thereupon the solvent is distilled off. The silicyl-ricinoleic acid ethyl ester represents an oil having theoretically a content of 2.13% of silicon. The analysis has shown a silicon content of 2.3%.

2. 40 parts of ricinoleic acid purified by forming the potassium salt are treated with 50 parts of ether and 20 parts of pyridine. Thereupon 8 parts of silicon tetrachloride are carefully added. After the mixture has finally been heated for some time upon the water bath the remainder of tetrachloride of silicon and pyridine hydrochloride is removed by shaking out the solution with dilute hydrochloric acid. The therial solution which had been washed with water until neutral reaction takes place is now further treated according to Example 1. The silicyl-ricinoleic acid is a viscous oil which is only slowly attacked by dilute alkalies. The mixture is now converted into the calcium salt as follows:

25 parts of silicyl-ricinoleic acid are dissolved in about 400 parts of ammonia (5%). 10 parts of calcium chloride in 150 parts of water are now slowly added with stirring. The precipitate which is of pure white color is washed with water until the chloride reaction disappears, thereupon dried and recrystallized from benzol. The pure white tasteless powder is also soluble in alcohol.

The dibromide of the silicyl-ricinoleic acid which is obtained from 5.8 parts of the latter with 3.5 parts of bromine in ethyl-alcohol under ice cooling is likewise of oily consistency. The calcium-salt may be produced in alcoholic solution by employing calcium chloride and gaseous ammonia. It is difficultly soluble in alcohol but still possesses the property of being soluble in benzol.

3. 7 parts of anhydrous zinc salt of dioxystearic acid are dissolved in 9 parts of pyridine and 20 parts of chloroform and 2 parts of silicon tetrachloride are added, at the same time cooling with ice. In order to complete the reaction the mixture is heated for some time upon the water bath and thereupon the solvents are evaporated in the vacuum. The solid residue is dissolved while hot in alcohol. On strong cooling pyridine zinc chloride will crystallize from the solution, while the mother liquor after distilling off the alcohol will leave as a residue the silicyl-dioxystearic acid which is at first of oily consistency and subsequently solidifies.

4. 6.6 parts of fully anhydrous zinc-lactate dissolved in pyridine is carefully mixed with 3.4 parts of silicon tetrachloride and finally the mixture is heated in an oil bath having a temperature of 120° C. in order to complete the reaction. After distilling off the main portion of the pyridine in the vacuum, the residue is washed with absolute alcohol. If ligroin is added to the alcoholic filtrate, the silicyl lactic acid will be separated which if several times washed with ligroin, shows approximately the content of silicon as calculated on the basis of the hereinabove given formula. The content of silicon had been found as being 7.44%, while according to the calculation the content of silicon would be 7.36%.

5. 12 parts of salicylic acid methyl ester are heated on the water-bath together with three parts of silicon tetrachloride until no more hydrochloric acid is evolved. The product of reaction which is heavily viscous is dissolved in a small quantity of chloroform and precipitated with petrol ether, the remaining quantity of salicylic acid methyl ester passing into the mother liquor. After dissolving in hot chloroform the residue may be separated by cooling. The thus obtained o-silicyl-salicylic acid methyl ester represented a crystalline mass having no distinct melting point and being soluble in chloroform, alcohol, acetone and difficultly soluble in ether and petrol ether. Experimentally there had been found 4.6% of silicon, while by calculation according to the above given formula the content of silicon amounts to 4.5%.

6. 8 parts of salicylic acid amyl ester are caused to interact mixed with 2 parts of silicon tetrachloride. The product of reaction is further treated in the manner stated in the above given Example 5. Also the amyl ester is a crystalline mass without typical melting point.

I claim:

1. A process for preparing organic silicyl compounds consisting in causing hydroxy carboxylic acids esterified in the carboxyl group to interact with silicon compounds selected from silicon halides and esters of silicic acid.

2. A process for preparing organic silicyl compounds consisting in causing hydroxy carboxylic acids esterified in the carboxyl group to interact with a silicic acid alkyl ester.

3. A process for preparing organic silicyl compounds consisting in causing hydroxy carboxylic acids esterified in the carboxyl group to interact with silicic acid tetraethyl ester.

4. A silicyl compound consisting of a hydroxy carboxylic acid having the hydrogen atom of the non-carboxylic hydroxyl group replaced by silicon and being esterified in the carboxyl group.

HANS KAUFMANN.